US012331243B2

(12) United States Patent
Grant et al.

(10) Patent No.: US 12,331,243 B2
(45) Date of Patent: Jun. 17, 2025

(54) CEMENT COMPOSITIONS AND METHODS OF PREPARATION THEREOF

(71) Applicant: Kraton Corporation, The Woodlands, TX (US)

(72) Inventors: Stephanie Grant, Houston, TX (US); David Germack, Houston, TX (US); Steven Huynh, Houston, TX (US)

(73) Assignee: KRATON CORPORATION, Houston, TX (US)

( * ) Notice: Subject to any disclaimer, the term of this patent is extended or adjusted under 35 U.S.C. 154(b) by 0 days.

(21) Appl. No.: 18/639,204

(22) Filed: Apr. 18, 2024

(65) Prior Publication Data
US 2024/0352303 A1   Oct. 24, 2024

Related U.S. Application Data

(60) Provisional application No. 63/496,925, filed on Apr. 18, 2023.

(51) Int. Cl.
| | |
|---|---|
| C09K 8/467 | (2006.01) |
| C04B 24/26 | (2006.01) |
| C04B 28/04 | (2006.01) |
| C04B 103/00 | (2006.01) |
| E21B 33/14 | (2006.01) |

(52) U.S. Cl.
CPC .......... C09K 8/467 (2013.01); C04B 24/2676 (2013.01); C04B 24/2688 (2013.01); C04B 28/04 (2013.01); E21B 33/14 (2013.01); C04B 2103/0051 (2013.01)

(58) Field of Classification Search
CPC . C09K 8/467; C04B 24/2676; C04B 24/2688; C04B 28/04; C04B 2103/0051; E21B 33/14
See application file for complete search history.

(56) References Cited

U.S. PATENT DOCUMENTS

| | | | | |
|---|---|---|---|---|
| 2013/0261220 | A1* | 10/2013 | Murphy | ................. C04B 26/04 |
| | | | | 523/130 |
| 2019/0071352 | A1* | 3/2019 | Wang | ....................... C08L 95/00 |
| 2021/0147703 | A1* | 5/2021 | Palyukh | ............ C09D 123/0853 |

FOREIGN PATENT DOCUMENTS

| | | | | |
|---|---|---|---|---|
| EP | 2530094 A1 | * | 12/2012 | ............. C08C 19/06 |
| WO | 2013148116 A2 | | 10/2013 | |
| WO | 2020242557 A1 | | 12/2020 | |

* cited by examiner

*Primary Examiner* — Crystal J Lee

(57) ABSTRACT

Cement compositions comprising a modified styrenic block copolymers and methods for making/using the same are disclosed. The modified styrenic block copolymer has at least one monoalkenyl arene polymer block A, at least one conjugated diene polymer block B, and at least an epoxy functional group or derivative thereof. The modified styrenic block copolymer has a degree of epoxidation of up to 10-90%. The cement composition can be used in subterranean applications, as well as in building and construction materials. The modified styrenic block copolymers swell upon contact water or other aqueous fluids to seal cracks in the cement.

19 Claims, No Drawings

CEMENT COMPOSITIONS AND METHODS OF PREPARATION THEREOF

RELATED APPLICATIONS

This application claims priority to U.S. Provisional Application No. 63/496,925, filed on Apr. 18, 2023, incorporated herein by reference in its entirety.

FIELD

The disclosure relates to cement compositions comprising modified styrenic block copolymers for use in construction applications such as subterranean, building, etc., and methods for making/using the same.

BACKGROUND

Cement compositions may be used in a variety of construction applications. For example, in subterranean well construction, a pipe string (e.g., casing, liners, expandable tubulars, etc.) may be run into a well bore and cemented in place, concrete beams for bridge construction, etc. In well constructions, typically, a cement composition is pumped into an annulus between the walls of the well bore and the exterior surface of the pipe string. The cement forms an annular sheath of hardened cement (i.e., a cement sheath) that can support, position, and bond the exterior surface of the pipe string to the subterranean formation. The cement sheath surrounding the pipe string functions to prevent the migration of fluids in the annulus and protect the pipe string from corrosion/deterioration and failure. The bonding between the cement sheath and the pipe string or borehole may become compromised. The principal causes of deterioration and debonding include physical stresses associated with tectonic movements, temperature changes, pressure changes inside the casing and chemical deterioration of the cement.

Improved cement compositions have been used in cementing operations in an effort to prevent cement failure, e.g., the formation of voids, cracks, fractures, holes and/or channels that may form in the cement. Swellable materials, such as polymers, have been used to mitigate the problem of deterioration of cement over time.

There is still a need for an improved cement composition with swellable material.

SUMMARY

In one aspect, a cement composition is disclosed. The cement composition comprises 100 parts by weight of a cement, 0.01-20 parts by weight of a modified styrenic block copolymer, and a mass ratio of an aqueous fluid to cement of 1:3 to 3:4. The modified styrenic block copolymer has at least one monoalkenyl arene polymer block A, at least one conjugated diene polymer block B, and at least an epoxy functional group or derivative thereof. The modified styrenic block copolymer has a degree of functionalization of up to 10-90% in the block B. The modified styrenic block copolymer is characterized as having an absorption rate of at least 0.05% upon exposure to water for at least 7 days.

In another aspect, the cement composition comprises 100 parts by weight of a cement; 0.01-20 parts by weight of a modified styrenic block copolymer, and a mass ratio of an aqueous fluid to cement of 1:3 to 3:4. The modified styrenic block copolymer is obtained by modifying a styrenic block copolymer precursor having at least one monoalkenyl arene polymer block A and at least one conjugated diene polymer block B with an epoxy functional group or derivative thereof. The modified styrenic block copolymer has a degree of epoxidation of up to 10-90% in the block B. The epoxidized styrenic block copolymer is characterized as having an absorption rate of at least 0.05% upon exposure to water for at least 7 days.

In another aspect, a method of cementing a wellbore is disclosed. The method comprises preparing a wellbore cementing composition, placing the wellbore cementing fluid in the wellbore, and allowing the cementing fluid to set. The cementing composition comprises 100 parts by weight of a cement, 0.01-20 parts by weight of a modified styrenic block copolymer, and a mass ratio of an aqueous fluid to cement of 1:3 to 3:4. The modified styrenic block copolymer has at least one monoalkenyl arene polymer block A, at least one conjugated diene polymer block B, and at least an epoxy functional group or derivative thereof. The modified styrenic block copolymer has a degree of functionalization of up to 10-90% in the block B. The modified styrenic block copolymer is characterized as having an absorption rate of at least 0.05% upon exposure to water for at least 7 days.

DESCRIPTION

The following terms will have the following meanings:

As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising," "including" and "containing" to provide for more specific aspects of the disclosure and are also disclosed.

"At least one of [a group such as A, B, and C]" or "any of [a group such as A, B, and C]" means a single member from the group, more than one member from the group, or a combination of members from the group. For example, at least one of A, B, and C includes, for example, A only, B only, or C only, as well as A and B, A and C, B and C; or A, B, and C, or any other all combinations of A, B, and C.

"Selected from X1, X2, X3, . . . , Xn, and mixtures thereof" means a single member of the group or more than a member of the group, e.g., X1, X2, X3, . . . Xn, or some, or all members of the group X1-Xn being present.

A list of embodiments presented as "A, B, or C" is to be interpreted as including the embodiments: A only, B only, C only, "A or B," "A or C," "B or C," or "A, B, or C."

"Block" as used herein refers to a section of a polymer molecule that comprises a plurality of identical constitutional units (monomers) and possesses at least one constitutional or configurative feature that does not appear in the immediately adjacent sections (blocks).

"Conjugated diene" refers to an organic compound containing conjugated carbon-carbon double bonds and a total of 4 to 12 carbon atoms, such as 4 to 8 carbon atoms, which can be any of 1,3-butadiene and substituted butadienes, including but not limited to 1,3 cyclohexadiene, isoprene, 2,3-dimethyl-1,3-butadiene, 1-phenyl-1,3-butadiene, 1,3-pentadiene, 3-butyl-1,3-octadiene, chloroprene, and piperylene, or any combination thereof. In embodiments, the conjugated diene block comprises a mixture of butadiene and isoprene monomers. In embodiments, 1,3-butadiene alone is used.

"Butadiene" can be used interchangeably to 1,3-butadiene.

"Monovinyl arene," or "monoalkenyl arene," or "vinyl aromatic" refers to an organic compound containing a single carbon-carbon double bond, at least one aromatic moiety, and a total of 8 to 18 carbon atoms, such as 8 to 12 carbon atoms. Examples include any of styrene, o-methyl styrene, p-methyl styrene, p-tertbutyl styrene, 2,4-dimethyl styrene, alpha-methyl styrene, vinylnaphthalene, vinyltoluene, vinylxylene, or mixtures thereof. In embodiments, the monoalkenyl arene block comprises a substantially pure monoalkenyl arene monomer. In some embodiment, styrene is the major component with minor proportions (less than 10 wt. %) of structurally related vinyl aromatic monomers such as o-methylstyrene, p-methyl styrene, p-tert-butyl styrene, 2,4-dimethyl styrene, a-methylstyrene, vinylnaphtalene, vinyltoluene, vinylxylene, or combinations thereof. In embodiments, styrene alone is used.

"Vinyl content" refers to the content of a conjugated diene that is polymerized via 1,2-addition in the case of butadiene, or via 3,4-addition in case of isoprene, resulting in a mono-substituted olefin, or vinyl group, adjacent to the polymer backbone. Vinyl content can be measured by nuclear magnetic resonance spectrometry (NMR).

"Coupling efficiency," expressed as % CE, is calculated using the values of the wt. % of the coupled polymer and the wt. % of the uncoupled polymer. The wt. % of the coupled polymer and the uncoupled polymer are determined using the output of the differential refractometer detector. The intensity of the signal at a specific elution volume is proportional to the amount of material of the molecular weight corresponding to a polystyrene standard detected at that elution volume.

"Coupling Agent" or "X" refers to the coupling agents commonly used in making styrenic block copolymers, e.g., silane coupling agents such as isobutyl-trimethoxy silane, methyltrimethoxysilane; polyvinyl compounds, polyvinyl arene, di- or multivinylarene compounds; di- or multiepoxides; di- or multiisocyanates; di- or multialkoxysilanes; di- or multiimines; di- or multialdehydes; di- or multiketones; alkoxytin compounds; di- or multihalides, such as silicon halides and halosilanes; mono-, di-, or multianhydrides; di- or multiesters; tin tetrachloride; tetramethyl orthosilicate.

"Polystyrene content" or PSC of a block copolymer refers to the % weight of vinyl aromatic, e.g., polystyrene in the block copolymer, calculated by dividing the sum of molecular weight of all vinyl aromatic blocks by the total molecular weight of the block copolymer. PSC can be determined using any suitable methodology such as proton nuclear magnetic resonance (1HNMR).

"Molecular weight" or MW refers to the styrene equivalent molecular weight in kg/mol of a polymer block or a block copolymer. MW can be measured with gel permeation chromatography (GPC) using polystyrene calibration standards, such as is done according to ASTM 5296-19. The GPC detector can be an ultraviolet or refractive index detector or a combination thereof. The chromatograph is calibrated using commercially available polystyrene molecular weight standards. MW of polymers measured using GPC so calibrated are styrene equivalent molecular weights or apparent molecular weights. MW expressed herein is measured at the peak of the GPC trace and is commonly referred to as styrene equivalent "peak molecular weights," designated as Mp.

"Residual Unsaturation" or RU refers to the level of unsaturation, i.e., carbon-carbon double bonds per gram of block copolymer. RU can be measured using nuclear magnetic resonance.

"Residual Unsaturation in rubber (RUrub)" refers to the levels of unsaturation, i.e., carbon-carbon double bonds per gram of block copolymer corrected for its aromatic content. It is calculated via the following equation: RUrub=RU*100/(100−PSC). RUrub can be measured using nuclear magnetic resonance (1HNMR).

"Hydrogenation level" (H2%) refers to the level of saturation of the olefinic double bonds into the block copolymer. It can be calculated using the following equation when producing the p-HSBC: H2%=100*(RU before hydrogenation−RU after hydrogenation)/RU before hydrogenation.

"Cement" refers to the dry cementitious material. "Cement composition" refers to a mixture of cement, e-SBC, aqueous fluid, and optional additives.

"Set" and all grammatical variations thereof, are intended to mean the process of a cement composition becoming hard or solid to a compressive strength of at least 1000 psi. It can take up to 48 hours or longer for a cement composition to set. Some cement compositions can continue to develop compressive strength over the course of several days. The compressive strength of a cement composition can reach over 10,000 psi (69 MPa).

The disclosure relates to cement compositions comprising, consisting essentially of, or consisting of an epoxy grafted styrenic block copolymer, cement, aqueous fluid, and optional additives.

Modified Styrenic Block Copolymer (e-SBC): The modified styrenic block copolymer contains at least one monoalkenyl arene polymer block A, at least one conjugated diene polymer block B, and at least an epoxy functional group or derivative thereof. Derivatives thereof refer to compounds that contain epoxy (epoxide) functional group as a structural component, with additional substituents or modifications, e.g., alkyl or aryl groups, functional groups such as hydroxyl or amino groups, crosslinking agents, modifiers, chiral substituents, and polymer chains of epoxy monomers. Modified SBC, epoxidized SBC (e-SBC), or epoxy-grafted SBC, or epoxy-functionalized SBC are used interchangeably, referring to a polymer where at least an epoxy group is grafted on the backbone, or the vinyl group adjacent to the polymer backbone of the styrenic block copolymer.

The e-SBC is formed by functionalizing or grafting a styrenic block copolymer (SBC) precursor with an epoxidizing agent, where the unsaturated double bond of the conjugated diene in the SBC is epoxidized.

As used herein, SBC precursor can be any of USBC, HSBC, or pHSBC, unless specifically specified otherwise. Unless specified otherwise, SBC refers to any of USBC, HSBC or pHSBC.

The SBC precursor or base polymer can be prepared by first copolymerizing one or more olefins, including at least one conjugated diene, by themselves or with one or more monoalkenyl arene monomers. The copolymers may or may not be tapered, the individual blocks may be homopolymers or random copolymers, and the polymer molecule may be linear or branched.

In embodiments, the SBC precursor has a structure selected from the group of A-B, A-B-A, A-B-A-B, (A-B-A)$_n$X, (A-B)$_n$X, and mixtures thereof, wherein n is a positive integer, X is the residue of a coupling agent. Each block A is predominantly a polymer block of monoalkenyl arene monomers and each polymer block B is predominantly a polymer block of conjugated diene monomers. Standard analytical techniques including 1HNMR can be used to detect the presence of and analyze the e-SBC structure.

The designation of "n," refers to the number of "arms" or "branches" in each of the structures, with n≥1. In embodiments, n ranges from 1-20, or 1-10, or 1-7.

In embodiments, each block A is selected from the group comprising, styrene, alpha-methyl styrene, methyl styrene, para-methyl styrene, ethyl styrene, propyl styrene, butyl styrene, tert-butyl styrene, dimethyl styrene, vinyl toluene, isomers of vinyl toluene, vinyl xylene, 1,1-vinyl biphenyl, vinyl naphthalene, vinyl anthracene, and mixtures thereof.

In embodiments, each block B is independently selected from the group consisting of polybutadiene, 1,3-butadiene, isoprene, 2,3-dimethyl-1,3-butadiene, 1-phenyl-1,3-butadiene, 1,3-pentadiene, 1,3-hexadiene, 3-butyl-1,3-octadiene, myrcene, farnesene, 1,3-cyclohexadiene, piperylene, and mixtures thereof. In embodiments, block B is selected from poly(isoprene-r-butadiene), poly(butadiene-r-styrene), wherein the -r- refers to a random copolymer, e.g., "poly(isoprene-r-butadiene)" means polyisoprene butadiene random copolymer.

In embodiments, the SBC precursor has an average 1,2-vinyl or 3,4-vinyl content of 6-80%, or 10-75%, or 15-45%, or 20-40 wt. %, or 25-35%, or >35%, or <80%. Vinyl content can be measured before or after hydrogenation, via 1HNMR.

In embodiments, the SBC precursor is unhydrogenated (USBC). The USBC is epoxidized forming an epoxy functionalized (unhydrogenated) styrenic block copolymer (e-USBC). In other embodiments, the SBC precursor is first hydrogenated at a hydrogenation level of at least 97% (HSBC). The HSBC is then epoxidized forming an epoxy functionalized hydrogenated styrenic block copolymer (e-HSBC). In yet other embodiments, the SBC precursor is partially hydrogenated before epoxidation (pHSBC). The pHSBC is then epoxidized forming an epoxidized partially hydrogenated styrenic block copolymer (e-pHSBC).

In embodiments, the molecular weight distribution of A block in the SBC precursor is in the range of 1-150 kg/mol styrene equivalent, or at least 120 kg/mol, or at least 130 kg/mol for the polymer block (S), and 8-20 kg/mol styrene equivalent, or 10-12 kg/mol, or at least 8.5 kg/mol, or at least 9.0 kg/mol for each of the polymer block (s).

In embodiments, each polymer block B has a molecular weight (Mp) of 2-350, or 5-300, or 7-250, or 10-200, or 5-150, or 3-100 kg/mol.

In embodiments, the SBC precursor has a Mw or Mp of 50-500 kg/mol, or 60-400 kg/mol, or 75-250 kg/mol, or <400 kg/mol, or <300 kg/mol, or <200 kg/mol.

In embodiments, the SBC precursor has a total polystyrene content (PSC) prior to hydrogenation is 10-50%, 15-50%, or 20-50%, or 20-45%, or >10%, or >15%, or >20%, or >25%, or <50%, or <45%, or <40%.

In embodiments, the SBC precursor contains 5-70 wt. %, or 10-65 wt. %, or 15-60 wt. %, or 20-45 wt. %, or >5 wt. %, or <70 wt. % of the monoalkenyl arene compound, and from 30-95 wt. %, or 35-90 wt. %, 45-80 wt. %, or >30 wt. %, or <95 wt. % of the conjugated diene (in each case based on the total monomers employed), as copolymerized units.

In embodiments, the SBC precursor is HSBC, having a hydrogenation level of >97%, or ≥98%, or <99.5%, or 97.5-99.5%, or 98-99.5%.

In embodiments, the SBC precursor is p-HSBC, having a hydrogenation level of 15-97%, or >20%, or 30-95%, or >40%, or <70%, or <80%, or <97%. Hydrogenation level refers to the percentage of original unsaturated bonds which become saturated upon hydrogenation. Hydrogenation level in the vinyl aromatic polymers can be determined using UV-VIS spectrophotometry or proton NMR. Hydrogenation level in the diene polymers can be determined using 1HNMR. In embodiments, the partially hydrogenated conjugated diene has a residual unsaturation or RU of <20 mmol/g, or <15 mmol/g, or <10 mmol/g, or <8 mmol/g, or >3 mmol/g, or <5 mmol/g, or 2-15 mmol/g, or >0.5 mmol/g. RU can be determined using 1HNMR. In embodiments, the partially hydrogenated conjugated diene has a residual unsaturation in the non-aromatic fraction of the p-HSBC or RU of 2 to 14 mmol/g, or 3-12 mmol/g, or 4-10 mmol/g, or <14.5 mmol/g.

In embodiments, the SBC precursor is epoxidized by generally known methods such as the use of a peracid exemplified by peracetic acid, hydrogen peroxide in the presence of acetic acid, and sulfuric acid or hydrogen peroxide in the presence of a low molecular weight fatty acid such as formic acid.

In embodiments, the peroxides used as functionalization/epoxidizing agent include per-carboxylic acids such as performic acid, peracetic acid, perpropionic acid, 3-chloroperoxybenzoic acid, potassium peroxymonosulfate, and mixtures thereof.

Epoxidation can be carried out by methods known in the art, as disclosed in U.S. Pat. No. 8,927,657B2, incorporated herein by reference. In embodiments, the production of epoxy functionalized SBC comprises: a first step of epoxidizing a SBC precursor in the presence of an epoxidizing agent and a solvent for accelerating epoxidation reaction to produce an e-SBC, a second step involves washing with water, or the neutralization and washing with water. In the third step, the solvent, which is used for accelerating the epoxidation reaction in the first step is removed by evaporation under a vacuum to obtain the e-SBC. The amount of the functionalization/epoxidizing agent added to SBC precursor varies based on the desired level of functionalization. Typically, this amount is in the range of 1-35, or 2-30, or 3-25, or 5-20, or 6-10 wt. %, based on the total weight of the rubber block and the epoxidizing agent.

In embodiments, e-SBC has a degree of epoxidation of 10-90%, 10-85%, or 10-80%, or 10-75%, 10-60%, 15-50%, or >15%, or >20%, relative to the polymer block susceptible to functionalization, i.e., the block B. The amount of epoxy in e-SBC can be measured by titration, FTIR, or 1HNMR.

In embodiments, the e-SBC is in crumb, pellet, flake, powder, or micro pellets form having an average particle size of <2000 μm, or <1000 μm. In embodiments, when the e-SBC is ground down to <1000 μm, the e-SBC is dusted with talc, silica, magnesium stearate, calcium carbonate, polyethylene glycol, kaolin, barium sulfate, or mixtures there.

In embodiments, the cement composition comprises a mixture of different e-SBCs, e.g., a mixture of at least two different e-USBCs, or e-HSBCs or e-pHSBCs, or a mixture of e-USBC and e-pHSBC, or a mixture of e-HSBC and e-pHSBC, etc. In embodiments, the cement composition comprises a mixture of different e-pHSBC's, with one e-pHSBC formed from pHSBC having a low vinyl content and the other e-pHSBC formed from a pHSBC having a high vinyl content. Low vinyl content means the p-HSBC precursor having an average 1,2-vinyl or 3,4-vinyl content of <50%, or <40%, or <38%, or <35%, or <30%, or <25%, or <20%, or <15%. High vinyl content means the p-HSBC precursor having an average 1,2-vinyl or 3,4-vinyl content of >50%, or >55%, or >60%, or >65%, or <80%.

The e-SBC is present in the cement composition in an amount of up to 20 parts by weight, or 0.01-20 parts by weight, or 1-15 parts by weight, or 1-10 parts by weight, 1-7 parts by weight, 1-6 parts by weight, 3-7 parts by weight, or >1 parts by weight, based on 100 parts by weight of the cement ("bwoc").

Cement: Any cement suitable for use in the desired application may be suitable for use in these cement compositions. In embodiments, the cement comprises a suitable cementitious material such as a hydraulic cement. In embodiments, the cement comprises calcium, aluminum, silicon, oxygen, and/or sulfur, which set and harden by reaction with water. Hydraulic cements include Portland cements, pozzolana cements, gypsum cements, high alumina content cements, slag cements, and silica cements, and combinations thereof. In embodiments, the Portland cements may be classified as Class A, C, G and H according to American Petroleum Institute, API Specification for Materials and Testing for Well Cements, API Specification 10, 5th Edition, Jul. 1, 1990. Portland cements may also be classified as Type I, IA, II, IIA, II(MH), II(MH)A, III, IIIA, IV, and V according to ASTM C150-22: Standard Specification for Portland Cement.

Aqueous Fluid: In addition to the e-SBC and cement, the composition comprises aqueous fluid. The aqueous fluid can be any of freshwater, saltwater (e.g., water containing one or more salts dissolved therein), brine (e.g., saturated saltwater produced from subterranean formations), seawater, or combinations thereof. The aqueous fluid may be from any source so long that it does not contain an excess of compounds that may undesirably affect other components in the cement composition.

In embodiments, a sufficient amount of aqueous fluid for the composition to be a pumpable fluid, e.g., having a viscosity lower than about 1000 mPa-s at a shear rate of 100 s-1 at the temperatures to which the fluid is exposed during a cementing operation. The viscosity range of the cement is dependent on admixture, solids content, time, and temperature. The cement is not an inert particle or slurry and hydrates as a function of time, and so becomes progressively more viscous. i.e. a plastic viscosity less than 500 cP for a fresh cement with minimal aggregate at ambient temperature/23 C.

In embodiments, the aqueous fluid is added in an amount sufficient to form a cement composition that can set in a sufficient amount of time depending on the application. In applications such as wellbore, the aqueous fluid may be included in the cement or concrete composition to hydrate and make the concrete workable, typically at an amount of 0.35-0.75, or 0.40-0.70, or 0.40-0.60, or 0.40-0.50 (mass of aqueous fluid to mass of cement/concrete). In embodiments, the mass ratio of aqueous fluid to cement ranges from 1:3 to 3:4, or 2:5 to 7:10, 2:5 to 3:5, or 2:5 to 1:2.

Optional Additives: The cement compositions can optionally comprise additives. Examples of such additives include, but are not limited to, strength-retrogression additives, set accelerators, set retarders, weighting agents, lightweight additives, gas-generating additives, mechanical property enhancing additives, lost-circulation materials, dispersants, fluid loss control additives, defoaming agents, foaming agents, thixotropic additives, and combinations thereof. Specific examples of these, and other, additives include silica (e.g., crystalline silica, amorphous silica, fumed silica, etc.), salts, fibers, hydratable clays, shale (e.g., calcined shale, vitrified shale, etc.), microspheres, diatomaceous earth, natural pozzolan, resins, latex, combinations thereof, and the like. Other optional additives may also be included, including, but not limited to, cement kiln dust, lime kiln dust, fly ash, slag cement, shale, zeolite, metakaolin, pumice, perlite, lime, silica, rice husk ash, small-particle size cement, combinations thereof, and the like.

In embodiments, the optional additives are present in the cement composition in an amount of up to 55 parts by weight, or 50 parts by weight, or 45 parts by weight, or 40 parts by weight, or 30 parts by weight, or 0-55 parts by weight, or 1-40 parts by weight, or 1-30 parts by weight, based on 100 parts by weight of the cement ("bwoc").

Methods of Making/Using: In embodiments, the components can be mixed in any order to form the cement composition. In embodiments, cement, e-SBC, optional additives, and aqueous fluid are mixed together to form the cement composition. In embodiments, the dry components, including cement, e-SBC and dry optional additives, can be mixed together then transported to the construction site, well-site, or field camp to be mixed with aqueous fluid and other liquid optional additives.

In embodiments, a method of using the cement composition comprises introducing, casting, or extruding the cement composition into an area or form and allowing the cement to set.

In embodiments, for use in oil and gas applications, the cement composition is introduced into a subterranean formation, and allowed to be set. In some embodiments, the cement composition is introduced into a space between a subterranean formation and a conduit (e.g., casing, expandable casing, liners, etc.) located in the subterranean formation. In remedial cementing embodiments, the cement composition may be used in squeeze cementing operations (e.g., to seal voids and/or holes in the formation, cement sheath, and/or a pipe) or in the placement of cement plugs.

Applications: The cement composition can be used in oil and gas (O&G) exploration applications, both above and below ground, as well as in building and construction applications. For building and construction applications, the cement composition may be used for decks, pre-stressed concrete beams, curbs, sidewalks, parapets (side traffic barrier walls), swimming pools, foundations, basement walls, chimneys, manholes, drainage systems, etc. For O&G applications, the cement composition may be used in subterranean applications, such as primary cementing, remedial cementing, and drilling operations. The cement composition may be useful to prevent voids, cracks, fractures, holes and/or channels from forming in the annular cement sheath; seal voids, cracks, fractures, holes and/or channels in the annular cement sheath; seal voids, cracks, fractures, holes and/or channels in the subterranean formation; prevent fluid loss; reduce the production of undesired water and/or gas from the subterranean formation.

During cementing operations, it is desirable for the cement composition to remain pumpable during introduction into the subterranean formation and until the cement composition is situated in the portion of the subterranean formation to be cemented. After the cement composition has reached the portion of the subterranean formation to be cemented, the cement composition can ultimately set. A cement composition that thickens too quickly while being pumped can damage pumping equipment or block tubing or pipes. A cement composition that sets too slowly can cost time and money while waiting for the composition to set.

Properties: The e-SBC in the cured cement composition swells after exposure to water or other aqueous fluids. As used herein, the term "swell" or "swellable" means the e-SBC can absorb water or other aqueous fluids and can swell. Generally, the e-SBC in the cement composition may expand more as time elapses. The e-SBC in the cement can swell up to 2.5%, 5%, or 10%, or 25%, or 40%, or 50%, or 75%, or 100%, of its original size.

In embodiments of a cement composition comprising e-SBC upon exposure to water for at least 7 days, the e-SBC in the cement composition has a water absorption rate of at least 0.03%, or at least 0.05%, or at least 0.07%, or at least 0.1%, or 0.3-0.25 wt. %, or 0.3-0.20%. In embodiments, upon exposure to water for at least 14 days, the e-SBC has a water absorption rate of at least 0.05%, or at least 0.1%, or at least 0.15%, or at least 0.20%, or 0.05-0.30%, or 0.05-0.25%. In embodiments, after 21 days of water exposure, the e-SBC has a water absorption rate of at least 0.1%, or at least 0.12%, or at least 0.15% or at least 0.20%, or 0.1-0.50%, or 0.1-0.40%. Water absorption can be measured by pouring 20 mL of cement composition into a 1-inch diameter, 25 mL cylindrical mold. Samples are placed in a pressure vessel and pressurized with 400 psi N2, then placed into a 65° C. (150° F.) oven and cured for 24 hours. The cured cements are weighed and placed in individual jars containing 50 mL tap water at ambient temperature. Samples are removed and dried after 1, 7, 14, and 21 days of soaking in water and weighed to calculate average weight change/water absorption.

In embodiments, the cement composition has a dial reading of at least 10 at 3 rpm at 80° F. In embodiments, when the cement composition has been conditioned at atmospheric pressure, for 30 minutes at 150° F., has a dial reading of at least 20 at 3 rpm at 150° F.

In embodiments, the cement composition has a dial reading of at least 40 at 300 rpm at 80° F. In embodiments, when the cement composition has been conditioned at atmospheric pressure, for 30 minutes at 150° F., has a dial reading of at least 200 at 300 rpm at 150° F.

In embodiments, the cement composition has a thickening time (70 Bc) of at least 1 hour, or at least 1.5 hours, or at least 2 hours, or 1-4.5 hours, or 2-4 hours, at a temperature of 150° F. and a pressure of 3,000 psi. In embodiments, the cement composition has a thickening time (100 Bc) of at least 1.5 hours, or at least 2 hours, or at least 2.5 hours, or at least 3 hours, or 1-5 hours, or 2-4 hours, at a temperature of 150° F. and a pressure of 3,000 psi.

In embodiments, the cement composition has a "crush" compressive strength of at least 3000 CS (psi), or at least 3100 CS (psi), or at least 3200 CS (psi), after being cured at 150° F. in atm water bath for 24 hours.

Examples: The following illustrative examples are intended to be non-limiting. The following test methods are used.

Epoxidized polymers used in the examples are in Table 1 below.

TABLE 1

Epoxidized Polymers

| Polymer | Description | PSC (%) | MW (kg/mol) | Vinyl content (%) | Hydrogenation Level (%) | Degree of Epoxidation (wt. %) |
|---|---|---|---|---|---|---|
| e-SBC1 | epoxidized linear triblock copolymer based on styrene and butadiene (S-B-S)nX | 1.1 | 67 | 9 | — | 72 |
| e-SBC2 | epoxidized linear triblock copolymer based on styrene and isoprene (S-I-S) | 24 | 80 | — | — | 35 |
| e-SBC3 | epoxidized partially hydrogenated linear triblock copolymer based on styrene and ethylene/butylene (S-EB-S) | 29 | 85 | 37 | 71 | 20 |
| e-SBC4 | epoxidized partially hydrogenated linear triblock copolymer based on styrene and ethylene/butylene (S-EB-S) | 29 | 85 | 60 | 71 | 20 |
| e-SBC5 | epoxidized partially hydrogenated linear triblock copolymer based on styrene and ethylene/butylene (S-EB-S) | 29 | 85 | 37 | 63 | 29 |
| e-SBC6 | epoxidized linear triblock copolymer based on styrene and isoprene (S-I-S) | 24 | 82 | — | — | 56 |
| e-SBC7 | epoxidized partially hydrogenated linear triblock copolymer based on styrene and ethylene/butylene (S-EB-S) | 29 | 85 | 37 | 71 | 22 |

Polymer 1 partially hydrogenated linear triblock copolymer based on styrene and ethylene/butylene (S-EB-S) with a polystyrene content of 30%, a vinyl content of 37%, mol weight of 40-100 kg/mol, and styrene rubber ratio of 30/70.

The cement used in the example is a class G oilwell cement.

Retarder 1 is an acrylic terpolymer.

Retarder 2 is based on purified lignosulfonates.

The cement composition was mixed according to American Petroleum Institute API RP 10B.

The cement was poured into a 1-inch diameter, 25 mL cylindrical molds. Approximately 20 mL of cement was poured into each mold. Molds were placed in a pressure vessel and pressurized with 400 psi $N_2$. Vessels were placed into a 65° C. (150° F.) oven and cured for 24 hours, then left to cool at ambient temperature, and cured cements were removed from the molds.

The cured cements were weighed and placed in individual jars containing 50 mL tap water at ambient temperature. Samples were removed and dried after 1, 7, 14, and 21 days of soaking in water and weighed to calculate average weight change/water absorption. Day 1 is considered the initial value for weight measurements.

Example 1 uses different e-SBCs at 1% bwoc loading in Portland Cement. Table 2 contains the formulation for the cement for 1% bwoc e-SBC or Polymer 1, and Table 3 has the average weight change by number of days. The e-SBC used in used in Example 1 was ground using a blender prior to mixing with the cement.

TABLE 2

Example 1 cement formulation with 1 bwoc of e-SBC
Class G Cement w/additive, 16.2 ppg

| Chemical | Amount | Amount (g) |
|---|---|---|
| Class G | 100 sk % | 413.2 |
| e-SBC | 1% bwoc | 4.1 |
| Tap Water | — | 171.7 | sk: sack
gal/sk: gallons added per sack of cement
bwoc: by weight of cement

TABLE 3

Average weight change by number of days for 1% e-SBC

| Days | Avg. Weight change by # Days (%) | | | |
|---|---|---|---|---|
| | 1 | 7 | 14 | 21 |
| e-SBC3 | 0 | 0.08 | 0.13 | 0.14 |
| e-SBC4 | 0 | 0.04 | 0.07 | 0.12 |
| e-SBC5 | 0 | 0.06 | 0.10 | 0.13 |
| e-SBC2 | 0 | 0.06 | 0.10 | 0.11 |

Example 2 uses different e-SBCs or polymers at 3% bwoc loading in Portland Cement. The e-SBC and Polymer 1 used in Example 2 was cryoground using a blender prior to mixing with the cement. Table 4 contains the formulation for the cement for 3% bwoc e-SBC. Table 5 below contains the average weight change by number of days.

TABLE 4

Example 2 cement formulation with 3% bwoc of e-SBC or Polymer 1
Class G Cement w/additive, 16.2 ppg

| Chemical | Amount | Amount (g) |
|---|---|---|
| Class G | 100 sk % | 414 |
| e-SBC or Polymer 1 | 3% bwoc | 12.4 |
| Tap Water | — | 155.9 |

TABLE 5

Average weight change by number of days for 3% e-SBC

| Days | Avg. Weight change by # Days (%) | | | |
|---|---|---|---|---|
| | 1 | 7 | 14 | 21 |
| Polymer 1 | 0 | 0.08 | 0.15 | 0.19 |
| e-SBC3 | 0 | 0.1 | 0.22 | 0.27 |
| e-SBC5 | 0 | 0.12 | 0.20 | 0.24 |
| e-SBC6 | 0 | 0.1 | 0.18 | 0.23 |
| e-SBC1 | 0 | 0.15 | 0.25 | 0.31 |

Example 3 uses different e-SBCs or polymers at 3%, 5%, and 7% bwoc loading in Portland Cement. Table 6 contains the formulation for the cement compositions, and Table 7 has the average weight change by number of days. The e-SBC used in Example 3 was cryoground using a Resch mill cryogrind to a size of <1000 μm prior to mixing with the cement.

TABLE 6

Cement formulations

| Chemical | 3% bwoc | | 5% bwoc | | 7% bwoc | |
|---|---|---|---|---|---|---|
| | Amount | Amount (g) | Amount | Amount (g) | Amount | Amount (g) |
| Class G | 100 sk % | 414 | 100 sk % | 414.7 | 100 sk % | 415.4 |
| e-SBC | 3% bwoc | 12.4 | 5% bwoc | 20.7 | 5% bwoc | 29.1 |
| Tap Water | — | 155.9 | — | 146.9 | — | 137.8 |

TABLE 7

Average weight change by number of days for e-SBCs

| Days | % bwoc | Avg. Weight change by # Days (%) | | | |
|---|---|---|---|---|---|
| | | 1 | 7 | 14 | 21 |
| e-SBC 7 | 3 | 0 | 0.16 | 0.25 | 0.3 |
| e-SBC 7 | 7 | 0 | 0.21 | 0.31 | 0.4 |
| Polymer 1 | 5 | 0 | 0.03 | 0.12 | 0.15 |

Cement formulations containing e-SBCs and Polymer 1 were further evaluated for performance. The following tests were performed: Rheology Test at 80° F. and 150° F.; Thickening Time tests at 150° F., and Destructive Compressive Strength tests at 150° F.

Examples 4-7 below are tested for rheology, thickening time, and comprehensive strength. Example/Formulation 4 is a cement control with no e-SBC added, Examples 5-7 utilize e-SBC3 in Formulations 5-7, and Example 8 utilizes e-SBC 1 in Formulation 8. e-SBC 3 was cryoground using a Reschmill cryogrind to a size of <1000 μm prior to mixing with the cement. All cement slurries were prepared as described in API RP 10B-2, Clause 5.

Some of the cement slurry compositions were conditioned at a target temperature of 150° F., a target pressure of atm, and the time to temp takes up to 30 minutes. The conditioned samples are indicated with an "A" below.

Rheology and Gel Strength: The cement slurries were prepared as described above and tested for Rheology and Gel Strength (10 seconds and 10 minutes), according to API RP 10B-2, Clause 11.4.

Thickening Time: The samples were tested for Thickening Time according to API RP 10B-2, Clause 9. As used herein, the "thickening time" is how long it takes for a cement composition to become unpumpable at a specified temperature and pressure. The pumpability of a cement composition is related to the consistency of the composition. The consistency of a cement composition is measured in Bearden units of consistency (Bc), a dimensionless unit with no direct conversion factor to the more common units of viscosity. As used herein, a cement composition becomes "unpumpable" when the consistency of the composition reaches 100 Bc.

Strength Tests: The slurries noted below were prepared as described in the above sections and tested for Compressive Strength, according to API RP 10B-2, using the "crush" test in Clause 7. The cube was cured in an atm water bath at 150° F. for 24 hours. At 45 minutes before the test time, the cubes were removed from the vessel and molds (sample cooling to 194° F. occurred prior to this time) and placed in an 80° F.±5° F. water bath to cool until test time.

The cement formulations 4-8 used in the below examples are as described below in Table 8.

TABLE 8

| Cement Slurry Formulations 4-8 | | |
|---|---|---|
| Material | Concentration | Amount (g) |
| Formulation 4 | | |
| Cement (class G) | 100% Sack Wt | 785.76 g |
| Retarder 1 | 0.30% BWOC | 2.36 g |
| Fresh Water | 5.00 gal/sack | 347.72 g |
| Formulation 5 | | |
| Cement (class G) | 100% Sack Wt | 787.96 g |
| Retarder 1 | 0.30% BWOC | 2.36 g |
| e-SBC3 | 3.00% BWOC | 23.64 g |
| Fresh Water | 4.61 gal/sack | 321.86 g |
| Formulation 6 | | |
| Cement (class G) | 100% Sack Wt | 789.44 g |
| Retarder 1 | 0.30% BWOC | 2.36 g |
| e-SBC3 | 5.00% BWOC | 39.47 g |
| Fresh Water | 4.36 gal/sack | 304.54 g |
| Formulation 7 | | |
| Cement (class G) | 100% Sack Wt | 790.92 g |
| Retarder 1 | 0.30% BWOC | 2.37 g |
| e-SBC3 | 7.00% BWOC | 55.36 g |
| Fresh Water | 4.10 gal/sack | 287.16 g |
| Formulation 8 | | |
| Cement (class G) | 100% Sack Wt | 781.54 g |
| Retarder 2 | 0.05% BWOC | 4.14 g |
| e-SBC1 | 5% BWOC | 39.08 g |
| Fresh Water | 4.49 gal/sk | 311.06 g |

The rheological results for Formulations 4-6 and 8 are found in Tables 9-12 below.

TABLE 9

| Rheological Results for Formulation 4 | | | | | |
|---|---|---|---|---|---|
| Fluid | Example 4 (80° F.) | | | Example 4A (150° F.) | | |
| rpm | up | down | ratio | up | down | ratio |
| 300 | 34 | 34 | 1.00 | 162 | 162 | 1.00 |
| 200 | 25 | 27 | 0.92 | 157 | 153 | 1.02 |
| 100 | 17 | 18 | 0.94 | 128 | 145 | 0.88 |
| 60 | 14 | 14 | 1.00 | 115 | 139 | 0.82 |
| 30 | 12 | 12 | 1.00 | 93 | 107 | 0.68 |
| 6 | 10 | 9 | 1.11 | 34 | 65 | 0.52 |
| 3 | 8 | 7 | 1.14 | 29 | 40 | 0.72 |
| 3 | 10 s GS, DR: N/A | | | 10 s GS, DR: 34 | | |
| 3 | 10 m GS, DR: N/A | | | 10 m GS, DR: 43 | | |

TABLE 10

| Rheological Results for Formulation 5 | | | | | |
|---|---|---|---|---|---|
| Fluid | Example 5 (80° F.) | | | Example 5A (150° F.) | | |
| rpm | up | down | ratio | up | down | ratio |
| 300 | 47 | 47 | 1.00 | 218 | 218 | 1.00 |
| 200 | 40 | 39 | 1.02 | 203 | 206 | 0.98 |
| 100 | 31 | 30 | 1.03 | 184 | 190 | 0.96 |
| 60 | 26 | 26 | 1.00 | 138 | 133 | 1.04 |
| 30 | 22 | 23 | 0.96 | 78 | 95 | 0.82 |
| 6 | 15 | 18 | 0.83 | 34 | 50 | 0.68 |
| 3 | 11 | 14 | 0.78 | 26 | 42 | 0.62 |
| 3 | 10 s GS, DR: N/A | | | 10 s GS, DR: 54 | | |
| 3 | 10 m GS, DR: N/A | | | 10 m GS, DR: 60 | | |

*Tests #5/5A were tested using the R1B5F1 configuration, due to the coarse polymer.

TABLE 11

| Rheological Results for Formulation 6 | | | | | |
|---|---|---|---|---|---|
| Fluid | Example 6 (80° F.) | | | Example 6A (150° F.) | | |
| rpm | up | down | ratio | up | down | ratio |
| 300 | 51 | 51 | 1.00 | 267 | 267 | 1.00 |
| 200 | 42 | 36 | 1.16 | 244 | 242 | 1.00 |
| 100 | 30 | 25 | 1.20 | 186 | 184 | 1.01 |
| 60 | 24 | 21 | 1.14 | 135 | 144 | 0.94 |
| 30 | 21 | 18 | 1.16 | 89 | 109 | 0.82 |
| 6 | 14 | 15 | 0.93 | 31 | 63 | 0.49 |
| 3 | 12 | 12 | 1.00 | 29 | 48 | 0.60 |
| 3 | 10 s GS, DR: N/A | | | 10 s GS, DR: 46 | | |
| 3 | 10 m GS, DR: N/A | | | 10 m GS, DR: 52 | | |

TABLE 12

| Rheological Results for Formulation 8 | | | | |
|---|---|---|---|---|
| | Example 8 (80° F.) | | Example 8 (150° F.) | |
| rpm | Neat | 5% bwoc | Neat | 5% bwoc |
| 300 | 54 | 45 | 88 | 94 |
| 200 | 43 | 38 | 88 | 94 |
| 100 | 28 | 30 | 67 | 92 |
| 6 | 15 | 20 | 25 | 45 |
| 3 | 13 | 18 | 17 | 37 |

TABLE 12-continued

Rheological Results for Formulation 8

| | Example 8 (80° F.) | | Example 8 (150° F.) | |
|---|---|---|---|---|
| rpm | Neat | 5% bwoc | Neat | 5% bwoc |
| 10 sec gel | — | — | 23 | 23 |
| 10 min gel | — | — | 20 | 25 |

Thickening time results for Formulations 4-5 are in Table 13 below.

TABLE 13

Thickening Time Results for Formulations 4-5

| # | Test Temp (° F.) | Test Press (psi) | Batch Mix (min)* | Initial Bc | 30 Bc at hh:mm | 50 Bc at hh:mm | 70 Bc at hh:mm | 100 Bc at hh:mm |
|---|---|---|---|---|---|---|---|---|
| 4 | 150 | 3,000 | N/A | 2 | 02:00 | 03:14 | 03:23 | 03:31 |
| 5 | 150 | 3,000 | N/A | 7 | 00:14 | 00:26 | 02:25 | 02:59 |

"Crush" comprehensive strength test (described above) results for Formulations 4-7 are in Table 14 below.

TABLE 14

"Crush" Compressive Strength Test Results

| | Formulation | 4 | 5 | 6 | 7 |
|---|---|---|---|---|---|
| | Ramp i.d. | A | A | A | A |
| Cube #1 | Area (sq in.) | 4.00 | 3.96 | 4.00 | 3.98 |
| | Force (lb$_f$) | 14,883 | 15,478 | 13,690 | 13,247 |
| | CS (psi) | 3720 | 3908 | 3422 | 3328 |
| Cube #2 | Area (sq in.) | 4.00 | 4.00 | 4.00 | 4.00 |
| | Force (lb$_f$) | 14,538 | 15,384 | 13,997 | 12,699 |
| | CS (psi) | 3634 | 3846 | 3499 | 3174 |
| Cube #3 | Area (sq in.) | 4.00 | 4.00 | 4.00 | 4.00 |
| | Force (lb$_f$) | 13,260 | 14,104 | 13,611 | 13,394 |
| | CS (psi) | 3315 | 3526 | 3402 | 3348 |
| | Average CS psi | 3560 | 3760 | 3440 | 3280 |

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the terms "include" or "contain" and their grammatical variants are intended to be non-limiting, such that recitation of items in a list is not to the exclusion of other like items that can be substituted or added to the listed items.

Unless otherwise specified, the recitation of a genus of elements, materials, or other components, from which an individual component or mixture of components can be selected, is intended to include all possible sub-generic combinations of the listed components and mixtures thereof.

The patentable scope is defined by the claims and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A cement composition comprising:
   100 parts by weight of a cement;
   0.01-20 parts by weight of a modified styrenic block copolymer having:
      at least one monoalkenyl arene polymer block A,
      at least one conjugated diene polymer block B, and
      at least an epoxy functional group or derivative thereof;
      wherein:
         the modified styrenic block copolymer has a degree of functionalization of 10-90% in the block B,
         the modified styrenic block copolymer is characterized as having an absorption rate of at least 0.05% upon exposure to water for at least 7 days;
      a mass ratio of an aqueous fluid to cement of 1:3 to 3:4.

2. The cement composition of claim 1, wherein the modified styrenic block copolymer is a solid, having an average particle size of <2000 μm, or preferably <1000 μm.

3. The cement composition of claim 1, wherein the modified styrenic block copolymer is dusted with talc, silica, magnesium stearate, calcium carbonate, polyethylene glycol, kaolin, barium sulfate, or mixtures thereof.

4. The cement composition of claim 1, wherein the monoalkenyl arene monomer is selected from the group of styrene, alpha-methyl styrene, methyl styrene, para-methyl styrene, ethyl styrene, propyl styrene, butyl styrene, tert-butyl styrene, dimethyl styrene, vinyl toluene, isomers of vinyl toluene, vinyl xylene, 1,1-vinyl biphenyl, vinyl naphthalene, vinyl anthracene, and mixtures thereof.

5. The cement composition of claim 1, wherein the conjugated diene monomer is independently selected from the group consisting of polybutadiene, 1,3-butadiene, isoprene, 2,3-dimethyl-1,3-butadiene, 1-phenyl-1,3-butadiene, 1,3-pentadiene, 1,3-hexadiene, 3-butyl-1,3-octadiene, myrcene, farnesene, 1,3-cyclohexadiene, piperylene, and mixtures thereof.

6. The cement composition of claim 1, wherein the modified styrenic block copolymer has a degree of epoxidation of 5-85%.

7. The cement composition of claim 1, wherein the modified styrenic block copolymer is obtained by modifying a styrenic block copolymer precursor with at least an epoxy functional group or derivative thereof, and wherein prior to modifying the styrenic block copolymer precursor, the styrenic block copolymer precursor has a structure selected from the group of A-B, A-B-A, A-B-A-B, (A-B-A)$_n$X, (A-B)$_n$X and mixtures thereof; wherein each block A is predominantly a polymer block of monoalkenyl arene monomers, each polymer block B is predominantly a polymer block of conjugated diene monomers, X is a residue of a coupling agent, and n is ≥1.

8. The cement composition of claim 7, wherein the styrenic block copolymer precursor has a molecular weight of 50-500 kg/mol.

9. The cement composition of claim 7, wherein the styrenic block copolymer precursor is any of an unhydrogenated styrenic block copolymer, a partially hydrogenated styrenic block copolymer, or a fully hydrogenated styrenic block copolymer.

10. The cement composition of claim 7, wherein the styrenic block copolymer precursor has an average 1,2-vinyl or 3,4-vinyl content of 6-80 wt. %.

11. The cement composition of claim 7, wherein the styrenic block copolymer precursor has a total polystyrene content of 10-50% prior to hydrogenation.

12. The cement composition of claim 1, wherein the aqueous fluid is selected from freshwater, saltwater, brine, seawater, or combinations thereof.

13. The cement composition of claim 1, wherein the cement comprises hydraulic cement, selected from the group of Portland cements, pozzolana cements, gypsum cements, high alumina content cements, slag cements, and silica cements, and combinations thereof.

14. A method of cementing a wellbore comprising: preparing a wellbore cementing composition comprising:
100 parts by weight of a cement,
0.01-20 parts by weight of a modified styrenic block copolymer having:
at least one monoalkenyl arene polymer block A,
at least one conjugated diene polymer block B, and
at least an epoxy functional group or derivative thereof;
wherein:
the modified styrenic block copolymer has a degree of functionalization of 10-90% in the block B,
the modified styrenic block copolymer is characterized as having an absorption rate of at least 0.05% upon exposure to water for at least 7 days;
a mass ratio of an aqueous fluid to cement of 1:3 to 3:4;
placing the wellbore cementing composition in the wellbore; and
allowing the cementing composition to set.

15. The method of claim 14, wherein the modified styrenic block copolymer is a solid, having an average particle size of <2000 μm.

16. The method of claim 14, wherein the modified styrenic block copolymer is dusted with talc, silica, magnesium stearate, calcium carbonate, polyethylene glycol, kaolin, barium sulfate, or mixtures thereof.

17. The method of claim 14, wherein the monoalkenyl arene monomer is selected from the group of styrene, alpha-methyl styrene, methyl styrene, para-methyl styrene, ethyl styrene, propyl styrene, butyl styrene, tert-butyl styrene, dimethyl styrene, vinyl toluene, isomers of vinyl toluene, vinyl xylene, 1,1-vinyl biphenyl, vinyl naphthalene, vinyl anthracene, and mixtures thereof.

18. The method of claim 14, wherein the conjugated diene monomer is independently selected from the group consisting of polybutadiene, 1,3-butadiene, isoprene, 2,3-dimethyl-1,3-butadiene, 1-phenyl-1,3-butadiene, 1,3-pentadiene, 1,3-hexadiene, 3-butyl-1,3-octadiene, myrcene, farnesene, 1,3-cyclohexadiene, piperylene, and mixtures thereof.

19. The method of claim 14, wherein the modified styrenic block copolymer is obtained by modifying a styrenic block copolymer precursor with at least an epoxy functional group or derivative thereof, and wherein prior to modifying the styrenic block copolymer precursor, the styrenic block copolymer precursor has a structure selected from the group of A-B, A-B-A, A-B-A-B, $(A-B-A)_nX$, $(A-B)_nX$ and mixtures thereof; wherein each block A is predominantly a polymer block of monoalkenyl arene monomers, each polymer block B is predominantly a polymer block of conjugated diene monomers, X is a residue of a coupling agent, and n is ≥1.

* * * * *